Inventor
WILLIAM E. O'SHEI
By
Holcombe, Wetherill & Brisebois
Attorneys

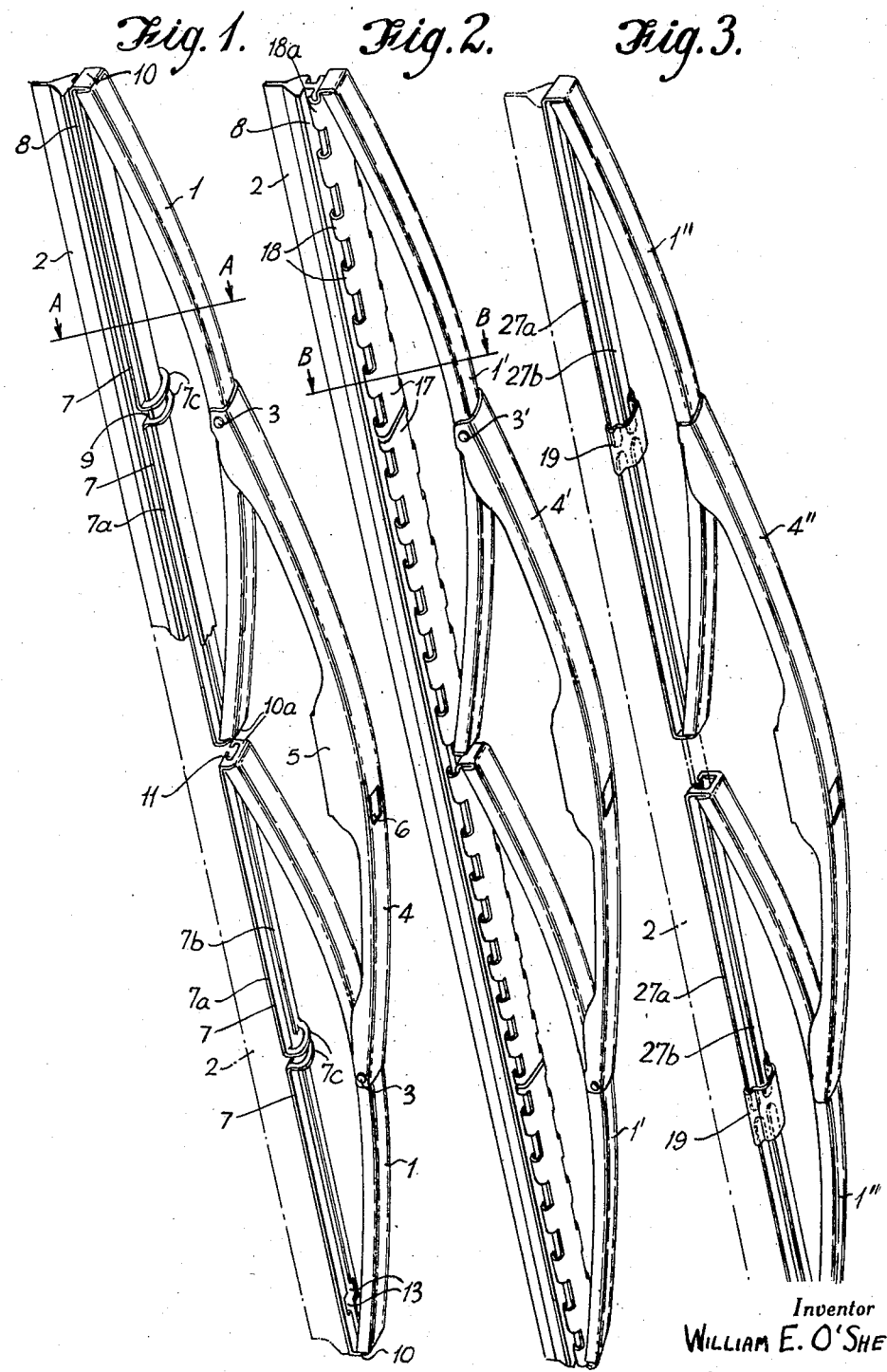

Nov. 11, 1958     W. E. O'SHEI     2,859,468
WINDSCREEN WIPER BLADES
Filed Jan. 20. 1955     3 Sheets-Sheet 3
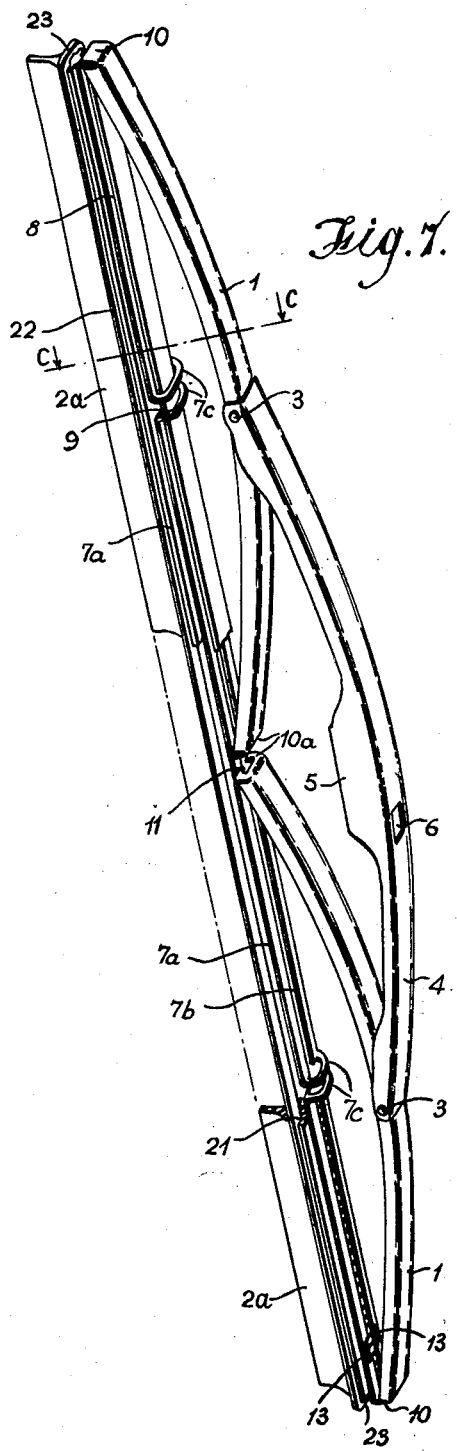
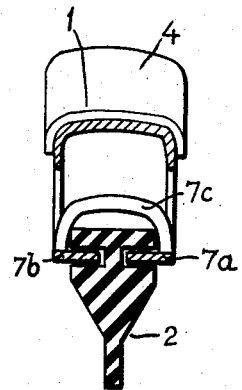
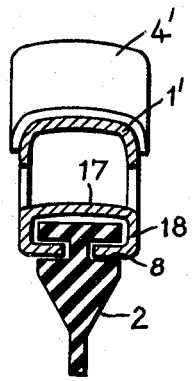
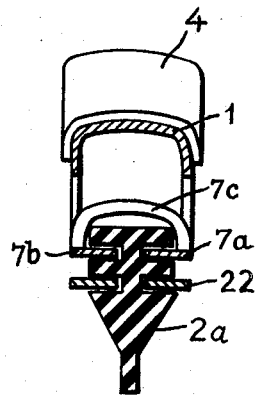
Inventor
William E. O'Shei
By
Attorneys

United States Patent Office 2,859,468
Patented Nov. 11, 1958

2,859,468

WINDSCREEN WIPER BLADES

William Edward O'Shei, London, England

Application January 20, 1955, Serial No. 483,133

11 Claims. (Cl. 15—245)

The present invention relates to windscreen wiper blades which are capable of wiping curved windscreens, but which are also suitable for wiping flat windscreens.

According to the present invention, a windscreen wiper blade comprises a yoke member, adjacent opposite ends of which are respectively attached two squeegee support members which extend inwardly of the ends of the yoke members and are connected to the squeegee element, said support members, along their lengths, restraining flexing of the squeegee element transversely to its median plane and either constituting leaf springs arranged to flex in a direction towards and away from the windscreen or constituting members which are hingedly or flexibly connected to the ends of the yoke and are associated with a spring or springs so that the members can flex or hinge about the yoke ends in a direction towards and away from the windscreen under the action of said spring or springs, the yoke member being so shaped or arranged that the support members can flex or turn about their connections to the ends of the yoke from a position in which the support members extend when the edge of the squeegee element is substantially straight to a position in which the squeegee element is concave. Conveniently the yoke member is of arched form so that the central region thereof will be spaced away from the support members and allow the latter to move or flex into the yoke when the squeegee element is to assume a concave form.

The yoke member may be provided with means for directly attaching it to the wiper arm or, alternatively, two or more such yoke members, with their associated supporting members, may be arranged end to end along the back of a continuous squeegee element, intermediate points on said yokes being pivotally or flexibly connected to a bridge piece, with, if necessary, the interposition of secondary yokes, said bridge piece being provided with means for attaching it to the wiper arm. Various modifications are possible as will later be explained.

According to a feature of the invention, the blade is also provided with one or more strips or other elongated members of flexible or springy material which extend at least part-way along the length of the squeegee element and bridge the gaps between the ends of adjacent support members and/or between the ends of adjacent yokes. Preferably the strip or member extends for the full length of the squeegee element and serves to assist in maintaining a uniform curvature along the entire length of the squeegee when the blade flexes to conform with a curved windscreen.

In order that the invention may be more clearly understood, various embodiments thereof will now be described, with reference to the accompanying drawings, in which:

Figure 1 is a perspective view, partly cut away, of one embodiment according to the invention.

Figure 1a is a section along the line A—A in Figure 1.

Figure 2 is a similar perspective view of an alternative embodiment.

Figure 2a is a section along the line B—B in Figure 2.

Figure 3 is a modification of Figure 1.

Figure 7 is a perspective view, partly cut away, of another embodiment of the invention.

Figure 7a is a section along the line C—C in Figure 7.

Figure 4:
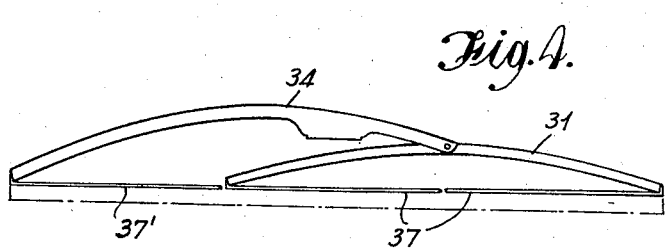
Figures 4 to 6 show diagrammatically various alternative arrangements of a wiper blade.

Referring to the embodiment shown in Figure 1, the wiper blade comprises two arched yoke members 1 of channel-shaped cross-section arranged end-to-end along the back of the squeegee element 2, intermediate points on the two yokes being pivotally connected, for example by the rivets 3, to opposite ends of a channel-section bridge piece 4 provided with means for attaching it to a wiper arm. In the embodiment shown, these attaching means comprise a hollow box-like cavity 5 at the centre of the bridge piece formed by bending inwardly the free edges of the channel side walls of this bridge piece, the back wall of the bridge piece being provided with an aperture 6 through which may be inserted the conventional curved end of a windscreen wiper arm. The attaching means may, however, be constructed in other ways to suit different constructions of wiper arm.

Extending inwardly from opposite ends of the yoke members 1 are two support members 7. In the embodiment shown in Figure 1 these support members are each constituted by two flat metal strips 7a, 7b, which constitute leaf springs, the flat faces of the springs being arranged substantially parallel to the surfaces of the windscreen over which the blade is adapted to wipe whereby the springs can flex in a direction towards and away from the windscreen but not to any appreciable extent in a direction transversely of the blade. The pairs of leaf springs 7a, 7b engage respectively in grooves 8 extending along the opposite sides of the squeegee element 2 whereby the squeegee element is connected to the springs. The free ends of each pair of leaf springs 7a, 7b may be interconnected by a loop portion 7c which loops around the rear of the squeegee element 2 as shown. These loop portions may conveniently be formed by transverse connecting pieces at the free ends of the springs, which connecting pieces are bent upwardly, notches 9 being formed to accommodate the rear flange of the squeegee element.

In the embodiment shown, the springs are formed integrally with the yokes by slotted extensions of the ends thereof, the extensions being bent downwardly to form the end portions 10 and then inwardly to form the support members 7. The end portions 10a at the inner ends of the two yokes are formed with notches 11 to allow the rear flanges of the squeegee element to extend therethrough. The outer end portions 10 of the two yokes may be imperforate in order to retain the squeegee element against longitudinal movement. To facilitate insertion of the squeegee element between the springs, the pair of springs adjacent one end of the blade may be formed with notches 13 through which the rear flange of the squeegee element may be inserted.

The squeegee element may be moulded with an appropriate cross-section to give backing-up support for its wiping edge.

In operation, the support members normally hold the squeegee element in a substantially straight condition, but when the blade has to wipe over a convex windscreen surface the free ends of the support members flex towards the central region of the yokes and the yokes themselves also pivot about their connections to the ends of the bridge piece, thereby allowing the wiping edge of the squeegee element to assume a concave form conforming with the curvature of the windscreen. Since the spring supports associated with one yoke are entirely separate from those of an adjacent yoke, the yokes are able freely to pivot relative to one another whereby the blade can be flexed to conform with a convex windscreen surface with a low wiper arm pressure.

Since the blade comprises a minimum of separate parts and the only mechanical joints are between the ends of the bridge piece and the yoke members, which latter can easily be made substantially free of looseness, the blade according to this invention produces negligible noise when it reverses its direction of movement at the end of each wiping stroke.

Furthermore, by slightly distorting the flexible support members, more or less pressure can be applied to any region of the squeegee element in order to ensure that the wiping edge of the squeegee element will touch and effectively wipe the windscreen at all points along its length.

Figure 2 shows a modification in which the support members, instead of being constructed as pairs of leaf springs engaging in grooves along opposite sides of the squeegee element, are constructed as single leaf springs 17 provided with teeth 18 along their edges, the free edges of the teeth being inwardly turned to embrace the rear flange of the squeegee element and hold the latter assembled to the support members. The support members may be made integral with the yoke members 1 and in order to prevent the squeegee element from sliding out of the end of the assembly, one of the pairs of teeth, for example 18a, may be pressed together to grip the rear of the squeegee element. The two yoke members 1' are pivotally connected by rivets 3' to opposite ends of the bridge piece 4'.

The adjacent ends of the two support members associated with a yoke member may be directly interconnected. For example, the said adjacent ends of the arrangement of Figure 1 may, as shown in Figure 3, be interconnected by a channel-shaped connector 19, which is slidable relative to at least one of the pairs of support members 27a, 27b of a yoke member 1". If desired, the loop portions 7c (Fig.1) may be omitted. Equivalent connectors may be devised for the arrangement of Figure 2.

Figure 5:
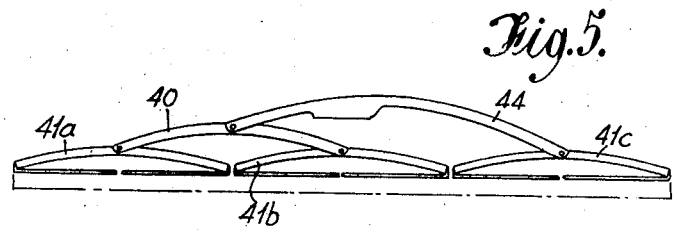
Figure 6:
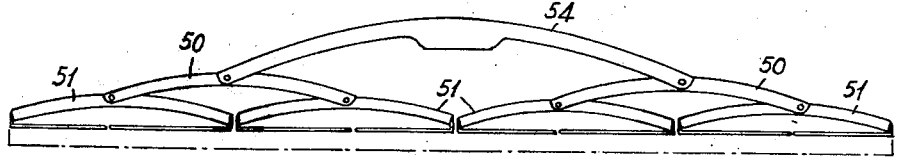

Figures 4-6 show diagrammatically alternative blade constructions. In Figure 4 only a single yoke member 31 with its associated support member 37 is provided and the bridge piece 34 connects at one end with an intermediate point on this yoke and at its other end is formed with a support member 37' which extends inwardly towards the yoke, as shown.

In the embodiment of Figure 5, two yoke members 41a, 41b have intermediate points thereon flexibly or hingedly connected to a secondary yoke 40, to an intermediate point on which is pivotally conected one end of the bridge piece 44, the other end of which is connected to an intermediate point on a third yoke member 41c.

In a further modification, as shown in Figure 6, four yoke members 51 are provided which are hingedly or flexibly connected in pairs by secondary yokes 50, intermediate points on the secondary yokes being hingedly or flexibly connected to the ends of the bridge piece 54.

It will be apparent from the above description that blades of any required length can easily be built up from yoke members of standard length.

In the embodiment shown in Figure 7, the arrangement shown in Figure 1 is modified by providing at opposite sides of the squeegee 2a an additional pair of grooves 21 beneath the pair of grooves 8 in which the support member 7 engage, and into these grooves 21 are fitted two flexible, and preferably springy, metal strips 22 which may be joined together at their ends by cross pieces 23. If desired, clips or other means may be provided at other points along the strips 22 to prevent them from splaying apart.

The blade constructed as described operates in a manner similar to the blade described with reference to Figure 1, the strips 22 constituting flexors extending along the entire length of the blade and restraining the squeegee to flex with a substantialy uniform curvature along its length.

This modification may also be applied to the embodiment shown in Figure 2 by positioning a flexible metal strip along the back of the squeegee element so that it lies beneath the support members 17 and will be held in position by the embracing fingers 18. The ends of the flexible strip may be provided with short downwardly projecting portions disposed outside the ends of the squeegee to restrain any relative longitudinal movement between the squeegee and the flexible strip.

In view of the additional support given to the squeegee by the flexible strip or strips, the gap between the inwardly facing ends of the support members may be increased, for example the support members may be reduced in length to about one half of the lengths shown in the drawing.

Whilst particular embodiments have been described, it will be understood that various modifications may be made without departing from the scope of the invention. Thus, for example, the support members need not be made integral with the yoke members as above described but may comprise, for example, separate spring members connected by welding, rivets or other suitable means adjacent opposite ends of the yoke. Furthermore, the two support members associated with a yoke need not be of the same length.

Various modifications in the shapes of the yoke members and support members are possible, the controlling factor being that the support members can move from an aligned position to the position they assume when wiping a convex windscreen. Thus the yokes may be straight and the support members spaced therefrom by appropriate hinges or connecting members at the ends of the yokes.

I claim:

1. Windscreen wiper blade comprising a squeegee element, a yoke member extending along the back thereof and two squeegee support members respectively connected to the yoke members only adjacent opposite ends of the yoke member and respectively extending only inwardly of the ends of the yoke member, said support members being connected to the squeegee element and restraining flexing of the squeegee element transversely to its median plane whilst being resiliently movable about their ends which are connected to the yoke members in the direction of said median plane and towards the yoke.

2. Windscreen wiper blade comprising a squeegee element having a continuous wiping edge, a plurality of yoke members disposed end-to-end along the back of the squeegee element, each yoke member having two squeegee support members respectively connected to the yoke members only adjacent opposite ends thereof and respectively extending only inwardly of the ends of the yoke member said support members being connected to the squeegee element and being movable about their ends which are attached to the yoke members in the direction of the median plane of the squeegee element from the position in which the support members are disposed when the squeegee element is substantially straight to a position in which the squeegee element is concave, whilst the support members restrain flexing of the squeegee element transversely of its median plane, a bridge-piece having its ends hingedly connected to different yoke members, and means for attaching said bridge-piece to a windscreen wiper arm.

3. Windscreen wiper blade comprising a squeegee element having a continuous wiping edge, a plurality of yoke members disposed along the back of the squeegee element, at least some of said yoke members each having two squeegee support members respectively connected to the associated yoke member only adjacent opposite ends thereof and respectively extending towards one another inwardly of the ends of the yoke member, each said squeegee support member comprising at least one strip of resilient material which is connected to the squeegee element and is arranged to flex in the direction of the median plane of the squeegee element whilst restraining flexing of the squeegee element transversely of its median plane, and a bridge-piece having one of its ends hingedly connected to at least one of said yoke members and its opposite end hingedly connected to at least one other of said yoke members.

4. Windscreen wiper blade as claimed in claim 3, wherein the support members comprise pairs of substantially parallel strips of resilient material which engage respectively in grooves extending along opposite sides of the squeegee element.

5. Windscreen wiper blade as claimed in claim 4, wherein the free ends of a pair of strips are connected together to prevent them from splaying apart.

6. Windscreen wiper blade as claimed in claim 3, wherein the support members comprise strips of resilient material extending along the back of the squeegee element with their flat surfaces substantially parallel to the surface of the windscreen, said strips being provided with fingers along each edge thereof which extend around and embrace the rear of the squeegee element.

7. Windscreen wiper blade as claimed in claim 3, wherein the free ends of the support members of a yoke are interconnected by a member which allows at least one of the support members to move relative thereto when the support members move to allow the squeegee element to assume a concave form.

8. Windscreen wiper blade as claimed in claim 3, comprising also at least one elongated member of flexible material which extends at least part-way along the length of the squeegee element and bridges a gap between the ends of adjacent support members, said at least one elongated member being assembled to the squeegee element so as to flex therewith.

9. Windscreen wiper blade as claimed in claim 8, wherein an elongated member extends for the full length of the squeegee element.

10. Windscreen wiper blade comprising a squeegee element, a yoke member extending along the back thereof, and two squeegee support members respectively connected to the yoke member only adjacent opposite ends of the yoke member and respectively extending towards one another inwardly of the ends of the yoke member, each said support member comprising at least one strip of resilient material which is connected to the squeegee element and arranged to flex in the direction of the median plane of the squeegee element but to restrain flexing of the squeegee element transversely to said median plane.

11. A windscreen wiper blade as claimed in claim 10, comprising also a bridge-piece provided with means for attaching the bridge-piece to a wiper arm, said bridge-piece being hingedly connected at one end to an intermediate point on the yoke member, its other end projecting beyond the end of the yoke member and having a squeegee support member comprising at least one strip of resilient material connected thereto at said other end and projecting inwardly thereof towards the yoke member, said support member being connected to a part of the squeegee element which projects beyond the end of the yoke member and permitting flexing of said part in the direction of said median plane but restraining flexing of the squeegee element transversely thereto.

References Cited in the file of this patent

UNITED STATES PATENTS

| | | |
|---|---|---|
| 2,596,063 | Anderson | May 5, 1952 |
| 2,634,446 | Mackie et al. | Apr. 14, 1953 |
| 2,667,656 | Oishei | Feb. 2, 1954 |